US009860320B2

(12) United States Patent
Lee et al.

(10) Patent No.: US 9,860,320 B2
(45) Date of Patent: Jan. 2, 2018

(54) NODE AND COMMUNICATION CONNECTING METHOD BETWEEN NODES

(71) Applicant: ELECTRONICS AND TELECOMMUNICATIONS RESEARCH INSTITUTE, Daejeon (KR)

(72) Inventors: Soo Hyung Lee, Daejeon (KR); Hyung Kook Jun, Daejeon (KR); Kyung Il Kim, Daejeon (KR); Kyeong Tae Kim, Daejeon (KR); Je Man Park, Seoul (KR); Yong Yeon Kim, Daejeon (KR); Won Tae Kim, Asan-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 173 days.

(21) Appl. No.: 14/623,068

(22) Filed: Feb. 16, 2015

(65) Prior Publication Data
US 2015/0249713 A1    Sep. 3, 2015

(30) Foreign Application Priority Data

Mar. 3, 2014    (KR) .......................... 10-2014-0024813

(51) Int. Cl.
*G06F 15/16*      (2006.01)
*H04L 29/08*     (2006.01)
*H04L 12/24*     (2006.01)

(52) U.S. Cl.
CPC ........ *H04L 67/141* (2013.01); *H04L 41/0806* (2013.01)

(58) Field of Classification Search
CPC ... H04L 67/10; H04L 67/104; H04L 41/0806; H04L 67/16; H04L 51/046;
(Continued)

(56) References Cited

U.S. PATENT DOCUMENTS 6,636,499 B1 *  10/2003  Dowling ............. H04L 12/4625
                                                370/338
2005/0198267 A1 *  9/2005  Parks ..................... H04L 67/16
                                                709/224
(Continued)

FOREIGN PATENT DOCUMENTS

KR   10-2008-0001144 A   1/2008

OTHER PUBLICATIONS

Dipanjan Chakraborty et al., "Toward Distributed Serivce Discovery in Pervasive Computing Environments", IEEE Transactons on Mobile Computing, vol. 5, No. 2, Feb. 2006, pp. 97-112.

*Primary Examiner* — Djenane Bayard
(74) *Attorney, Agent, or Firm* — LRK Patent Law Firm

(57) ABSTRACT

A communication connecting method between nodes through a network, includes: storing communication connection information acquired through searching for communication entities of other nodes; determining whether communication connection information on a communication entity of a connection target node exists by searching for the stored communication connection information; and configuring communication connection with the communication entity of the connection target node based on the determination result.

10 Claims, 5 Drawing Sheets

(58) Field of Classification Search
CPC .............. H04L 67/1072; H04L 67/325; G06F 11/1464; G06F 17/30997
See application file for complete search history.

(56) References Cited

U.S. PATENT DOCUMENTS

| | | |
|---|---|---|
| 2007/0150570 A1 | 6/2007 | Eastham |
| 2012/0278452 A1* | 11/2012 | Schmitz .............. H04L 63/0807 709/220 |
| 2012/0324033 A1 | 12/2012 | Kim et al. |
| 2014/0141770 A1* | 5/2014 | Campos ................ H04W 48/18 455/426.1 |
| 2014/0177453 A1* | 6/2014 | Kang .................. H04L 43/0811 370/242 |

* cited by examiner

NODE AND COMMUNICATION CONNECTING METHOD BETWEEN NODES

CROSS-REFERENCE TO RELATED APPLICATIONS

This application claims priority to and the benefit of Korean Patent Application No. 10-2014-0024813 filed in the Korean Intellectual Property Office on Mar. 3, 2014, the entire contents of which are incorporated herein by reference.

TECHNICAL FIELD

The present invention relates to a node and a communication connecting method between nodes, and more particularly, to a node that performs communication connection in a data distribution service (DDS) and a communication connecting method between nodes.

BACKGROUND ART

In general, when a communication entity as a target of connection is directly recognized in configuring communication connection and connection information for communication entities is managed, the communication connection may be directly configured based on the connection information. However, as the number of communication entities constituting all application domains is rapidly increased and types of exchanged data and the number of provided services are also rapidly increased, it is not easy for individual nodes to manage the communication entities in overall. Since data and services provided/required for each node may be changed according to a state, it is actually difficult for each node to configure/manage information on a counterpart communication entity to be connected by the node in advance. As a result, communication middleware appears in order to perform the advance configuration/management and a data distributions service (DDS) technology standardized in the Object Management Group (OMG) is used primarily in a national defense field.

A technology for searching for the communication entity in the communication middleware using the DDS technology performs node searching by using a multicasting or broadcasting group communication scheme for communication nodes between which data are to be exchanged. Thereafter, each node searches for a communication entity that will take charge of transmitting data to be exchanged for all searched nodes. In the case of a complex system in which a lot of nodes are combined, if the respective nodes transmit the search message simultaneously with system booting, an overload on the network is caused, and as a result, it takes a long time until all nodes complete exchanging the search message.

SUMMARY OF THE INVENTION

The present invention has been made in an effort to provide a node in which communication connection is possible at high speed and a communication connecting method between nodes.

The objects of the present invention are not limited to the aforementioned objects, and other objects, which are not mentioned above, will be apparent to those skilled in the art from the following description.

An exemplary embodiment of the present invention provides a communication connecting method between nodes through a network, including: storing communication connection information acquired through searching for communication entities of other nodes; determining whether communication connection information on a communication entity of a connection target node exists by searching for the stored communication connection information; and configuring communication connection with the communication entity of the connection target node based on the determination result.

In the configuring of the communication connection with the communication entity of the connection target node based on the determination result, when the communication connection information on the communication entity of the connection target node exists in the stored communication connection information, the communication connection with the communication entity of the connection target node may be configured.

The method may further include verifying effectiveness of the communication entity of the connection target node when the communication connection information on the communication entity of the connection target node exists in the stored communication connection information according to the determination result.

In the verifying of the effectiveness of the communication entity of the connection target node, an effectiveness verification message may be transmitted to the connection target node and an effectiveness verification response message for the effectiveness verification message may be received to verify the effectiveness of the communication entity of the connection target node.

In the configuring of the communication connection with the communication entity of the connection target node based on the determination result, when the communication connection information on the communication entity of the connection target node does not exist in the stored communication connection information, communication entities of the other nodes and a communication entity management module including the communication entities of the other nodes may be re-searched and communication connection with the searched communication entity of the connection target node may be configured.

In the configuring of the communication connection with the communication entity of the connection target node based on the determination result, when the communication connection information on the communication entity of the connection target node does, not exist in the stored communication connection information, a search message may be transmitted to the other nodes to re-search the communication entities of the other nodes and the communication entity management module including the communication entities of the other nodes.

The search message may be transmitted to the other nodes at a randomly selected time within a predetermined time interval by setting the predetermined time interval as a maximum value.

Another exemplary embodiment of the present invention provides a node configuring communication connection with other nodes through a network including: a storage module storing communication connection information on communication entities acquired through searching for communication entities of the other nodes; a search module determining whether to re-search a communication entity of a connection target node by searching for communication connection information on the communication entities stored in the storage module; and a communication connection setting module configuring the communication connection with the communication entity of the connection target node based on the communication connection information stored in the storage module.

The search module may skip re-searching for the communication entity of the connection target node when the communication connection information on the communication entity of the connection target node exists in the communication connection information on the communication entities stored in the storage module.

The search module may transmit a search message to the other nodes to re-search for communication entities of the other nodes and a communication entity management module including the communication entities of the other nodes when the communication connection information on the communication entity of the connection target node does not exist in the communication connection information on the communication entities stored in the storage module.

The node may further include a time setting module randomly setting a transmission time of the search message within a predetermined time interval by setting the predetermined time interval as a maximum value.

The node may further include an effectiveness verification module verifying effectiveness of a communication entity of the connection target node based on the communication connection information stored in the storage module.

The node may further include a counter module counting the number of effectiveness verification times for the communication entity of the connection target node.

The communication connection configuration module may configure communication connection with the communication entity of the connection target node when the communication connection information on the communication entity of the connection target node exists in the communication connection information on the communication entities stored in the storage module.

According to exemplary embodiments of the present invention, in nodes and a communication connecting method between nodes, high-speed communication is connectable between nodes.

Figure 1:
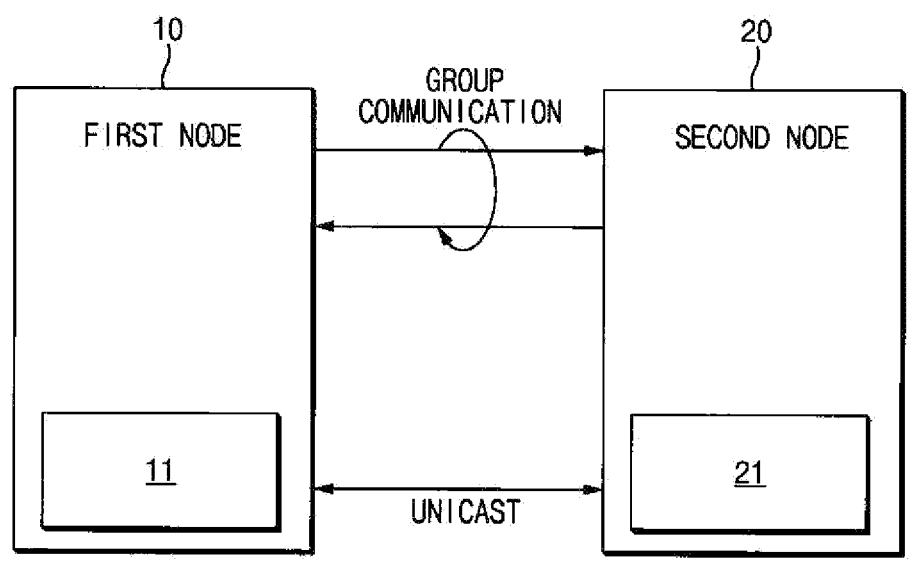
FIG. 1 is a diagram for describing a general communication connecting method between nodes.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, some exemplary embodiments of the present invention will be described in detail with reference to the accompanying drawings. When reference numerals refer to components of each drawing, it is to be noted that although the same components are illustrated in different drawings, the same components are referred to by the same reference numerals as possible. In describing the exemplary embodiments of the present invention, when it is determined that the detailed description of the known configuration or function related to the present invention may obscure the understanding the exemplary embodiment of the present invention, the detailed description thereof will be omitted.

Terms such as first, second, A, B, (a), (b), and the like may be used in describing the components of the exemplary embodiments of the present invention. The terms are only used to distinguish a constituent element from another constituent element, but nature or an order of the constituent element is not limited by the terms. Unless otherwise defined, all terms used herein including technological or scientific terms have the same meaning as those generally understood by a person with ordinary skill in the art to which the present invention pertains. Terms which are defined in a used dictionary in a generally used dictionary should be interpreted to have the same meaning as the contextual meaning of the related art, and are not interpreted as an ideally or excessively formal meaning unless clearly defined in the present invention.

FIG. 1 is a diagram for describing a general communication connecting method between nodes.

Referring to FIG. 1, a first node 10 and a second node 20 are exemplarily illustrated in order to describe the general communication connecting method between nodes.

The first node 10 means a communication node including a communication entity 11 that first transmits a search message for searching and may be all communication nodes that actually request or provide data or services.

The second node 20 means a communication node including a communication entity 21 that receives the search message and transmits a search response message including connection information of the second node when the second node provides or requests the data or services mentioned in the search message.

The communication entity 11 or 21 means one logical execution object that requests or provides the data or services to other communication entities in order to perform a specific function constituting all application domains on an actual communication node and performs actual communication connection in order to request or provide the data or services.

The first node 10 and the second node 20 may be connected through a network that provides multicasting or broadcasting. For example, in the case of wired and wireless LANs, a communication medium is shared among the respective communication nodes, and as a result, the broadcasting function and the resulting multicasting function may be fundamentally provided.

That is, referring to FIG. 1, the communication entity is searched in DDS middleware, and each node transmits the search message for node searching by using a group communication scheme of multicasting or broadcasting to communication nodes that intend to exchange data during a general node-to-node communication connection process for configuring the communication connection. Thereafter, each node searches for a communication entity that will take charge of transmitting data to be exchanged for all searched nodes.

Figure 2:
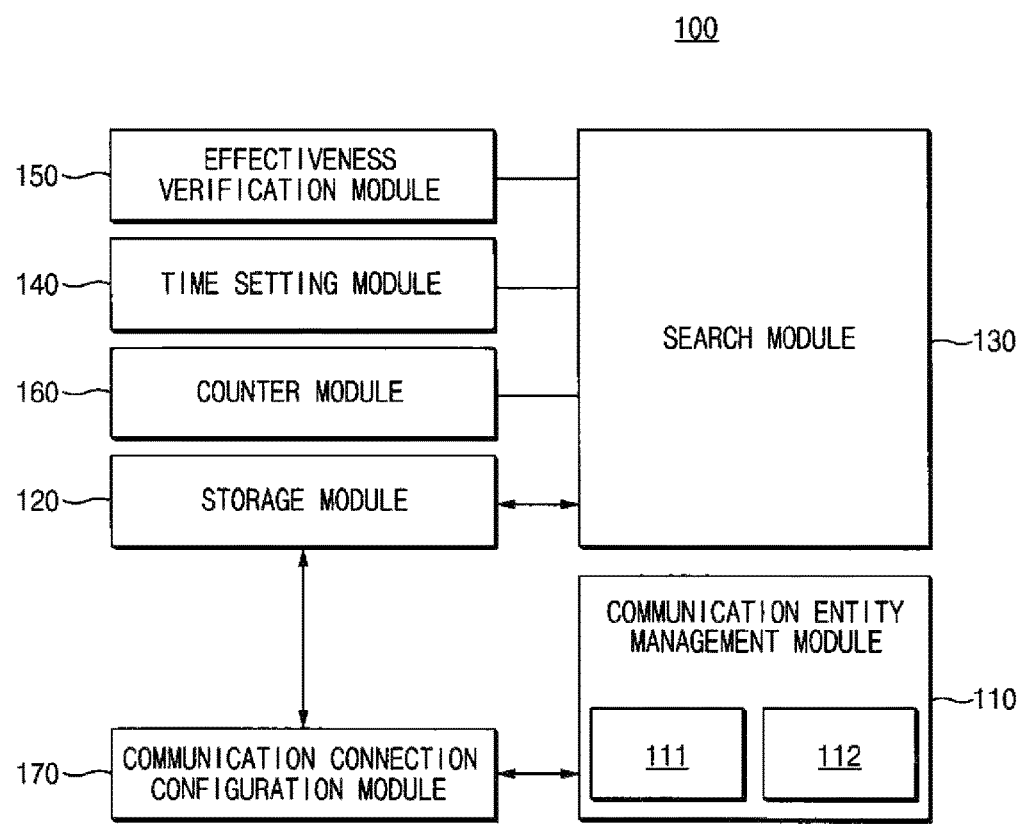
FIG. 2 is a block diagram illustrating a node according to an exemplary embodiment of the present invention.

FIG. 2 is a block diagram illustrating a node according to an exemplary embodiment of the present invention.

Referring to FIG. 2, the node 100 according to the exemplary embodiment of the present invention may include a communication entity management module 110, a storage module 120, a search module 130, a time setting module 140, an effectiveness verification module 150, a counter module 160, and a communication connection configuration module 170.

The communication entity management module 110 may create and manage at least one communication entity 111 and/or 112. For example, the communication entities 111 and 112 may include a data write DW for transmitting data and a data reader DR for receiving data. In one example, the communication entity management module 110 as a container entity for managing the communication entities 111 and 112 may be defined as a domain participant DP.

The storage module 120 may store communication connection information on the respective communication entities, which is acquired through searching for communication entities of other nodes (not illustrated). That is, the storage module 120 may store the communication connection information on the communication entities searched through the search module 130.

The search module 130 transmits the search message to other nodes connected with the node 100 through the network to search for communication entity management modules and communication entities of the respective nodes. For example, a searching process by the search module 130 may be the same as the searching process described with reference to FIG. 1. The search module 130 may store in the storage module 120 the communication connection information on the searched communication entity. For example, the search module 130 may store in the storage module 120 the communication connection information on the searched communication entity whenever performing searching.

The search module 130 may skip a re-searching process when communication connection information on a communication entity of a connection target node to be communication-connected exists in the communication connection information on the respective communication entities stored in the storage module 120.

On the contrary, the search module 130 may re-search the communication entity management modules and the communication entities of the respective nodes when communication connection information on a communication entity of a connection target node to be communication-connected does not exist in the communication connection information on the respective communication entities stored in the storage module 120.

The time setting module 140 may randomly set a transmission time of the search message within a predetermined time interval by setting the predetermined time interval to a maximum value. When in particular, each node transmits various search messages through the setting of the transmission time of the search message, collisions among the search messages transmitted by each node may be minimized. The time setting module 140 may set a stand-by time before verifying the effectiveness of the communication entity of the connection target node when the communication connection information on the communication entity of the connection target node exists in the storage module 120.

The effectiveness verification module 150 may verify the effectiveness of the communication entity of the connection target node when the communication connection information on the communication entity of the connection target node exists in the storage module 120. For example, the effectiveness verification module 150 may verify the effectiveness by transmitting an effectiveness verification message to the communication entity of the connection target node and receiving an effectiveness verification response message from the communication entity.

The counter module 160 may preset the number of effectiveness verification times (e.g., a counter value) of the effectiveness verification module 150 and count whenever the effectiveness is verified.

The communication connection configuration module 170 may configure the communication connection with the communication entity of the connection target node based on the communication connection information stored in the storage module 120. For example, when the communication connection information on the communication entity of the connection target node exists in the communication connection information stored in the storage module 120, the communication connection configuration module 170 may configure the communication connection with the communication entity of the connection target node by using the communication connection information.

As described above, the node 100 according to the exemplary embodiment of the present invention may determine whether to perform a search (alternatively, re-search) process of the communication entity based on the communication connection information on the communication entities stored in the storage module 120. In general, since a plurality of network environments in which the complex system is operated does not support mobility of the node, when searching among the respective nodes is completed and the communication connection is thus configured, communication connection information among most nodes is not changed.

Accordingly, the node 100 according to the exemplary embodiment of the present invention stores the communication connection information on the communication entity of which searching is completed in advance and may enable the communication connection to be configured directly without the need of performing the search process when the communication connection information on the communication entity of the connection target node to be communication-connected exists in the storage module 120. For example, the respective nodes may configure the communication connection among the nodes without re-searching upon rebooting the complex system. Consequently, high-speed communication connection configuration is enabled among the nodes and efficiency of the search performed among the nodes may be improved.

Figure 3:
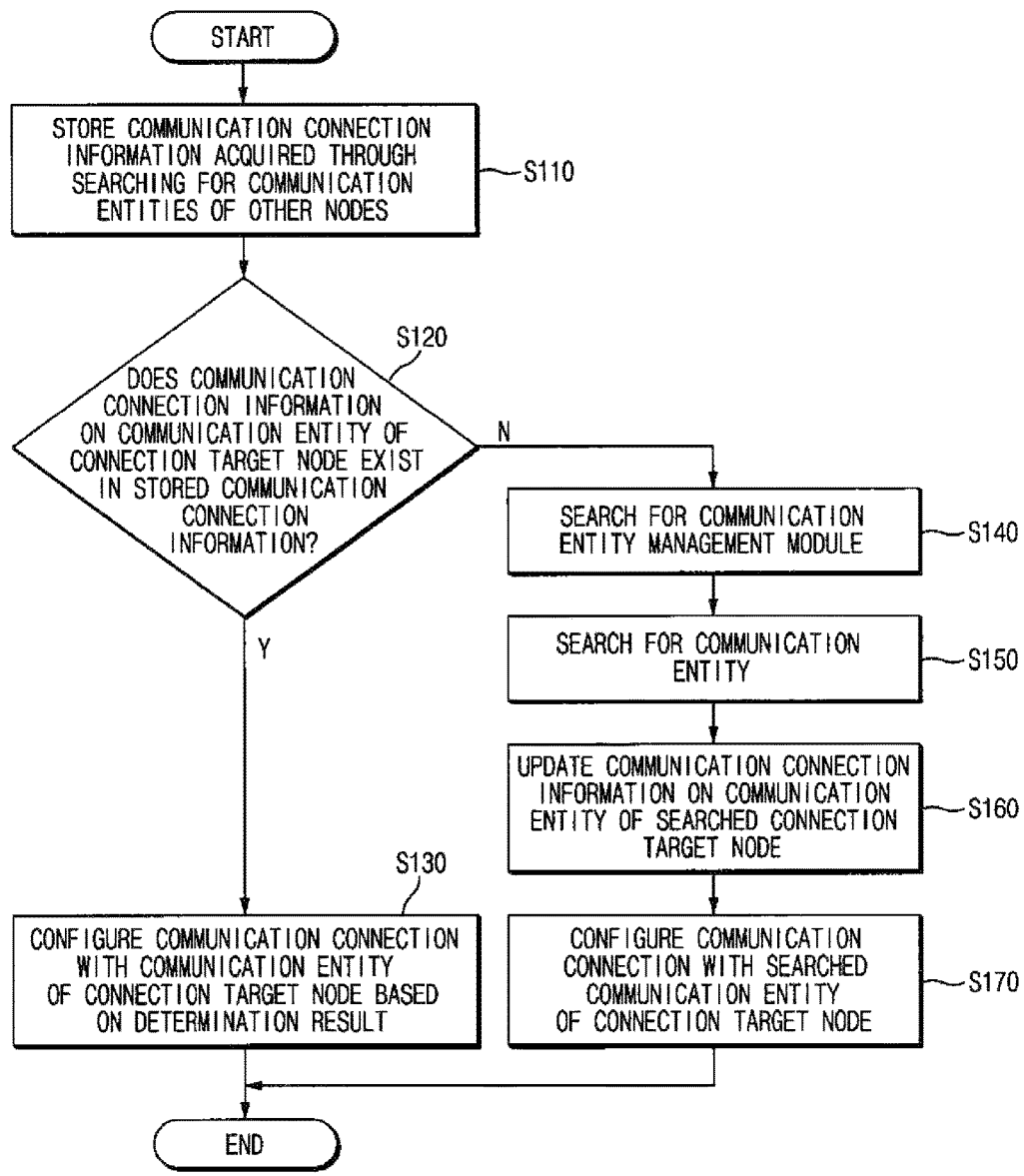
FIG. 3 is a flowchart illustrating a communication connecting method between nodes according to an exemplary embodiment of the present invention.

FIG. 3 is a flowchart illustrating a communication connecting method between nodes according to an exemplary embodiment of the present invention.

Referring to FIG. 3, the communication connecting method between nodes according to the exemplary embodiment of the present invention may include storing communication connection information acquired through searching for communication entities of other nodes (S110), determining whether communication connection information on a communication entity of a connection target node exists in the stored communication connection information (S120), and configuring communication connection with the communication entity of the connection target node based on a determination result (S130).

Step S130 may be performed when the communication connection information on the communication entity of the connection target node exists in the stored communication connection information, according to the determination result in step S120.

Meanwhile, according to the determination result in step S120, when the communication connection information on the communication entity of the connection target node does not exist in the stored communication connection information, the communication connecting method may include searching for a communication entity management module (S140), searching for a communication entity (S150), updating the communication connection information on the communication entity of the searched connection target node (S160), and configuring communication connection with the communication entity of the searched connection target node (S170).

Hereinafter, steps S110 to S170 described above will be described in detail with reference to FIG. 2.

In step S110, the search module 130 may store in the storage module 120 the communication connection information acquired through searching for communication entities of other nodes.

In step S120, the communication connection configuration module 170 may determine whether the communication connection information on the communication entity of the connection target node exists in the communication connection information stored in the storage module 120.

In step S130, when the communication connection information on the communication entity of the connection target node exists in the communication connection information stored in the storage module 120, the communication connection configuration module 170 may configure the communication connection with the communication entity of the connection target node by using the corresponding communication connection information.

In step S140, when the communication connection information on the communication entity of the connection target node does not exist in the communication connection information stored in the storage module 120, the search module 130 may search for a communication entity management module of the connection target node.

In step S150, the search module 130 may search for a communication entity included in the searched communication entity management module of the connection target node.

In step S160, the search module 130 stores in the storage module 120 the communication connection information on the searched communication entity of the connection target node to update the communication connection information.

In step S170, the communication connection configuration module 170 may configure communication connection with the communication entity by using the communication connection information on the communication entity of the connection target node transferred from the search module 130.

Figure 4:
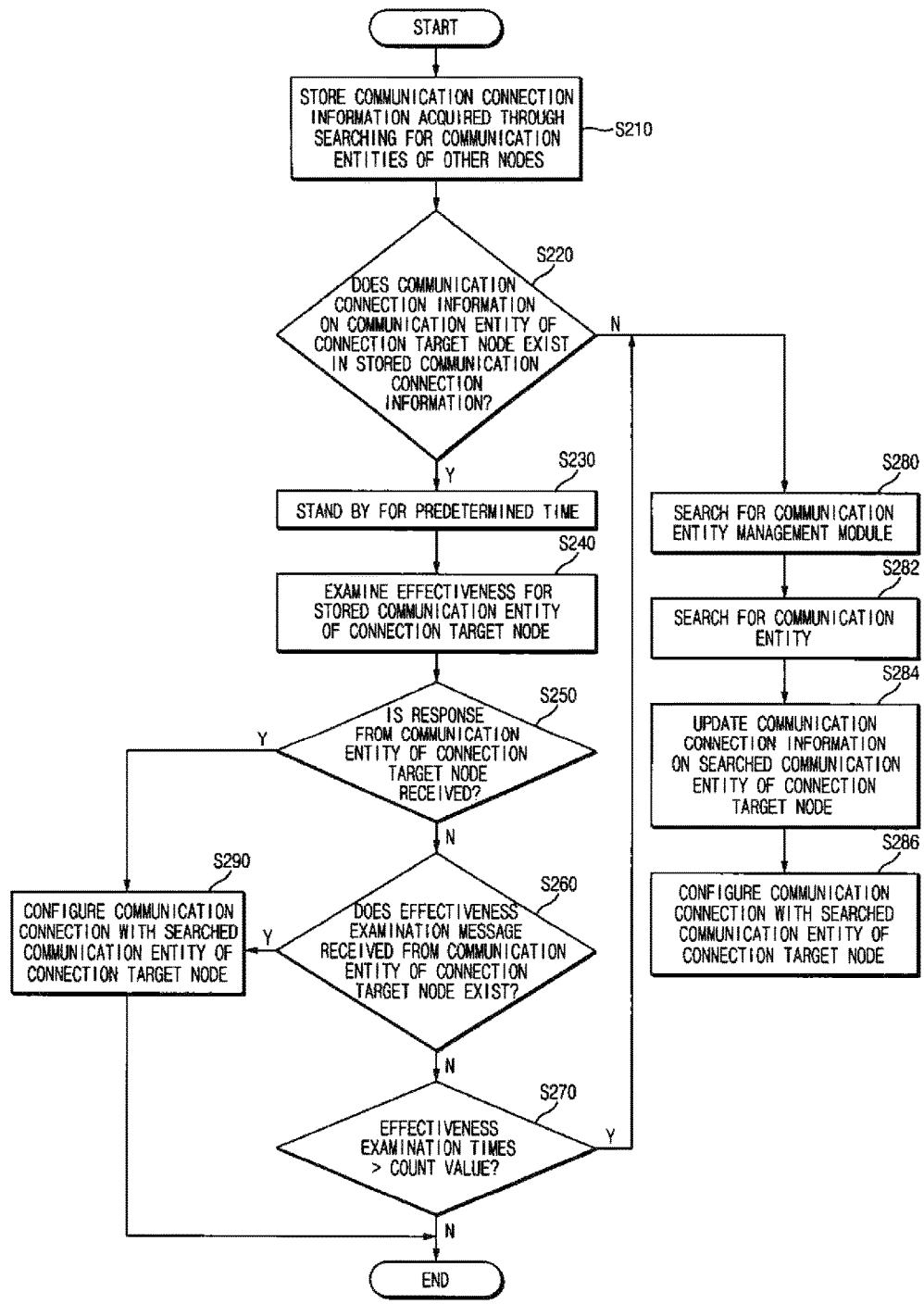
FIG. 4 is a flowchart illustrating a communication connecting method between nodes according to another exemplary embodiment of the present invention.

FIG. 4 is a flowchart illustrating a communication connecting method between nodes according to another exemplary embodiment of the present invention.

Referring to FIG. 4, the communication connecting method between nodes according to another exemplary embodiment of the present invention may include storing communication connection information acquired through searching for communication entities of nodes (S210), determining whether communication connection information on a communication entity of a connection target node exists in the stored communication connection information (S220), standing by for a predetermined time (S230), verifying effectiveness of the stored communication connection information of the communication entity of the connection target node (S240), verifying whether a response is received from the communication entity of the connection target node (S250), verifying whether an effectiveness examination message is received from the communication entity of the connection target node (S260), and determining whether the number of effectiveness examination times is larger than a predetermined count value (S270).

Meanwhile, when the communication connection information on the communication entity of the connection target node does not exist in the stored communication connection information according to a determined result in step S220, searching for a communication entity management module (S280), searching for a communication entity (S282), updating the communication connection information on the communication entity of the searched connection target node (S284), and configuring communication connection with the communication entity of the searched connection target node (S286) may be performed. Steps S280 to S286 described above may be the same as steps S140 to S170 described with reference to FIG. 3, respectively.

According to the determination results in steps S250 and S260, when the response is received from the communication entity of the connection target node or the effectiveness examination message is received from the communication entity of the connection target node, configuring communication connection with the communication entity of the connection target node (S290) may be performed.

Hereinafter, steps different from the respective steps illustrated in FIG. 3 will be primarily described in order to avoid duplication with the exemplary embodiment described with reference to FIG. 3.

In step S230, the effectiveness verification module 150 may stand by for a predetermined stand-by time set by the time setting module 140.

In step S240, the effectiveness verification module 150 may verify the effectiveness of the communication entity of the connection target node based on the communication connection information stored in the storage module 120. For example, the effectiveness verification module 150 may verify the effectiveness by transmitting the effectiveness verification message to the communication entity of the connection target node. For example, the effectiveness verification message may be an end point (EP) search message defined in the DDS.

In step S250, the effectiveness verification module 150 may verify whether an effectiveness verification response message corresponding to the effectiveness verification message is received from the communication entity of the connection target node. According to a verification result in step S250, when the effectiveness verification response message is received, step S290 will be performed.

In step S260, the effectiveness verification module 150 may verify whether the effectiveness verification message prereceived from the communication entity of the connection target node exists. For example, the effectiveness verification message prereceived from the communication entity of the connection target node exists may be verified because even in the case where the communication connection information is changed, such as a change in address information of the connection target node, the effectiveness verification message may be received based on information stored in the storage module from the connection target node side. According to a verification result in step S260, when the effectiveness verification message exists, step S290 may be performed.

In step S270, the counter module 160 may preset the number of effectiveness verification times by the effectiveness verification module 150 and count whenever the effectiveness is verified. For example, when the number of effectiveness verification times is larger than a predetermined number of times (count value), step S280 may be performed.

Figure 5:
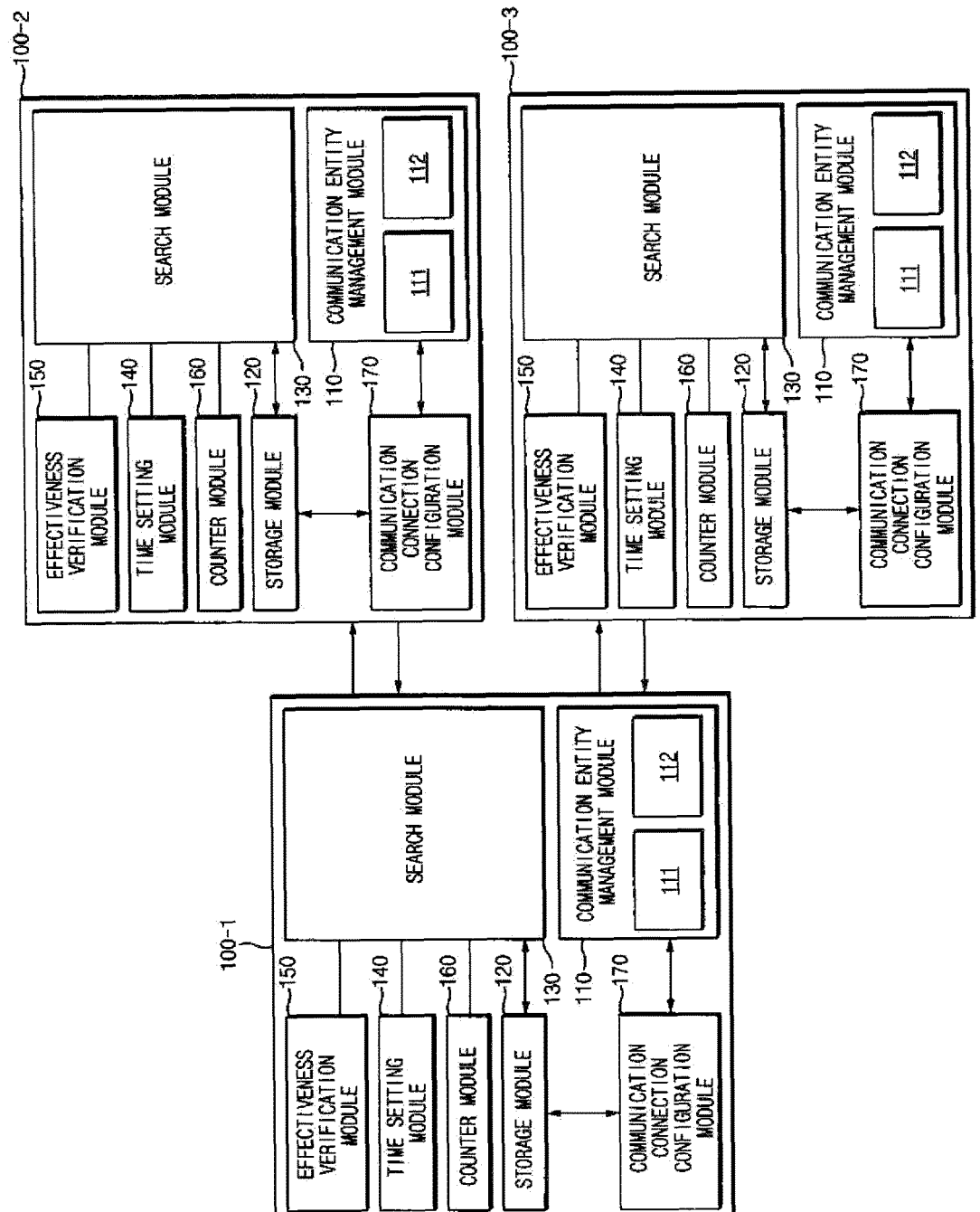
FIG. 5 is a diagram for describing a communication connecting method between nodes according to an exemplary embodiment of the present invention.

FIG. 5 is a diagram for describing a communication connecting method between nodes according to an exemplary embodiment of the present invention.

Referring to FIG. 5, a node 100-1 may configure communication connection with nodes 100-2 and 100-3 connected through a network.

For example, it is assumed that communication connection information on a communication entity of the node 100-2 is not stored and communication connection information on a communication entity of the node 100-3 is stored in a storage module 120 of the node 100-1.

In this case, the node 100-1 may configure communication connection with the communication entity of the node 100-3 by using the communication connection information on the communication entity of the node 100-3 stored in the storage module 120 without an additional searching process. On the contrary, the node 100-2 re-searches for the communication entity management module and the communication entity of the node 100-2 to configure the communication connection by using the communication connection information on the searched communication entity.

Steps of a method or an algorithm described in association with the exemplary embodiments disclosed in the specification may be directly implemented by hardware and software modules executed by the processor, or a combination thereof. The software module may reside in storage media such as a RAM memory, a flash memory, a ROM memory, an EPROM memory, an EEPROM memory, a register, a hard disk, a removable disk, and a CD-ROM or a predetermined storage medium of a difference type known to those skilled in the art. The exemplary storage medium is coupled to the processor and the processor may read information from the storage medium and write the information in the storage medium. As another method, the storage medium may be integrated with the processor. The processor and the storage medium may reside in an application specific integrated circuit (ASIC). The ASIC may reside in a user terminal. As another method, the processor and the storage medium may reside in the user terminal as individual components.

The above description just illustratively describes the technical spirit of the present invention and various changes, modifications, and variations become apparent to those skilled in the art within a scope without departing from an essential characteristic of the present invention. Accordingly, the embodiments disclosed herein are intended not to limit but to describe the technical spirit of the present invention, and the scope of the technical spirit of the present invention is not limited to the embodiments. The protective scope of the present invention may be interpreted by the appended claims and all the technical spirits in the equivalent range thereto are intended to be embraced by the claims of the present invention.

What is claimed is:

1. A communication connecting method between nodes through a network in a data distribution service (DDS), the method comprising:

storing communication connection information acquired through searching for communication entities of other nodes;

determining whether communication connection information on a communication entity of a connection target node exists by searching for the stored communication connection information to thereby produce a determination result; and configuring communication connection with the communication entity of the connection target node based, on the determination result, wherein the communication entities of the other nodes are communication entities for transmitting and receiving data comprising messages, and wherein the communication entity of the connection target node is a communication entity for transmitting and receiving data comprising messages, wherein in the configuring of the communication connection with the communication entity of the connection target node based on the determination result, when the communication connection information on the communication entity of the connection target node does not exist in, the stored communication connection information, a search message is transmitted to the other nodes to re-search the communication entities of the other nodes and a communication entity management module including the communication entities of the other nodes, and wherein the search message is transmitted to the other nodes at a randomly selected time within a predetermined time interval by setting the predetermined time interval as a maximum value.

2. The method of claim 1, wherein in the configuring of the communication connection with the communication entity of the connection target node based on the determination result, when the communication connection information on the communication entity of the connection target node exists in the stored communication connection information, the communication connection with the communication entity of the connection target node is configured.

3. The method of claim 2, further comprising:

verifying effectiveness of the communication entity of the connection target node when the communication connection information on the communication entity of the connection target node exists in the stored communication connection information according to the determination result.

4. The method of claim 3, wherein in the verifying of the effectiveness of the communication entity of the connection target node, an effectiveness verification message is transmitted to the connection target node and an effectiveness verification response message for the effectiveness verification message is received to verify the effectiveness of the communication entity of the connection target node.

5. The method of claim 1, wherein in the configuring of the communication connection with the communication entity of the connection target node based on the determination result, when the communication connection information on the communication entity of the connection target node does not exist in the stored communication connection information, communication entities of the other nodes and a communication entity management module including the communication entities of the other nodes are re-searched and communication connection with the searched communication entity of the connection target node is configured.

6. A node configuring communication connection with other nodes through a network in a data distribution service (DDS), comprising:
- a storage module storing communication connection information on communication entities acquired through searching for communication entities of the other nodes;
- a search module determining whether to re-search a communication entity of a connection target node by searching for communication connection information on the communication entities stored in the storage module; and
- a communication connection configuration module configuring the communication connection with the communication entity of the connection target node based on the communication connection information stored in the storage module, wherein the communication entities of the other nodes are communication entities for transmitting and receiving data comprising messages, and wherein the communication entity of the connection target node is a communication entity for transmitting and receiving data comprising messages, and wherein the search module transmits a search message to the other nodes to re-search for communication entities of the other nodes and a communication entity management module including the communication entities of the other nodes when the communication connection information on the communication entity of the connection target node does not exist in the communication connection information on the communication entities stored in the storage module.

7. The node of claim 6, wherein the search module skips re-searching for the communication entity of the connection target node when the communication connection information on the communication entity of the connection target node exists in the communication connection information on the communication entities stored in the storage module.

8. The node of claim 6, further comprising:
- an effectiveness verification module verifying effectiveness of a communication entity of the connection target node based on the communication connection information stored in the storage module.

9. The node of claim 8, further comprising:
- a counter module counting the number of effectiveness verification times for the communication entity of the connection target node.

10. The node of claim 6, wherein the communication connection configuration module configures communication connection with the communication entity of the connection target node when the communication connection information on the communication entity of the connection target node exists in the communication connection information on the communication entities stored in the storage module.

* * * * *